Sept. 27, 1938. A. GEYER 2,131,418
CONTINUOUS KILN
Filed March 10, 1937 16 Sheets-Sheet 4

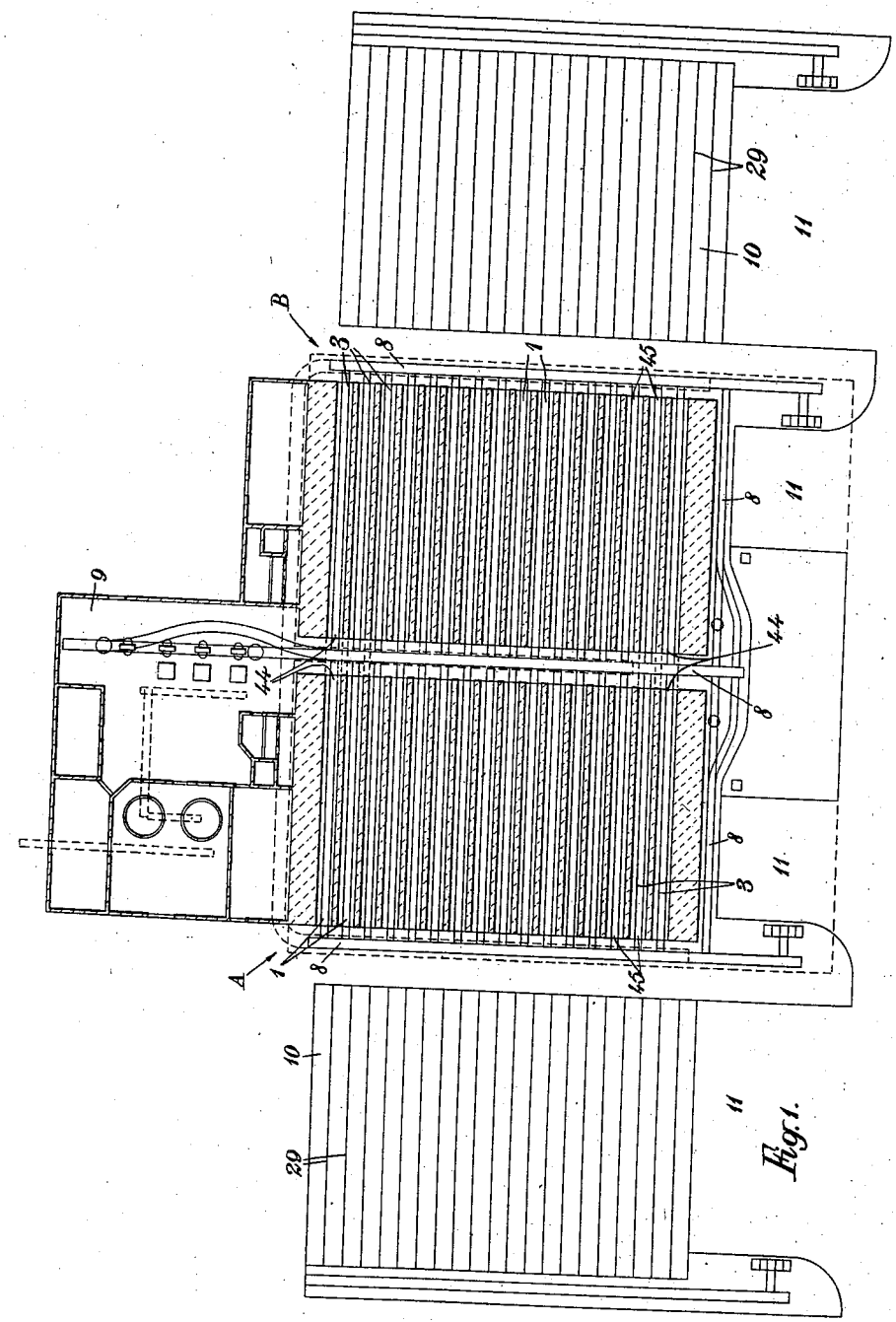

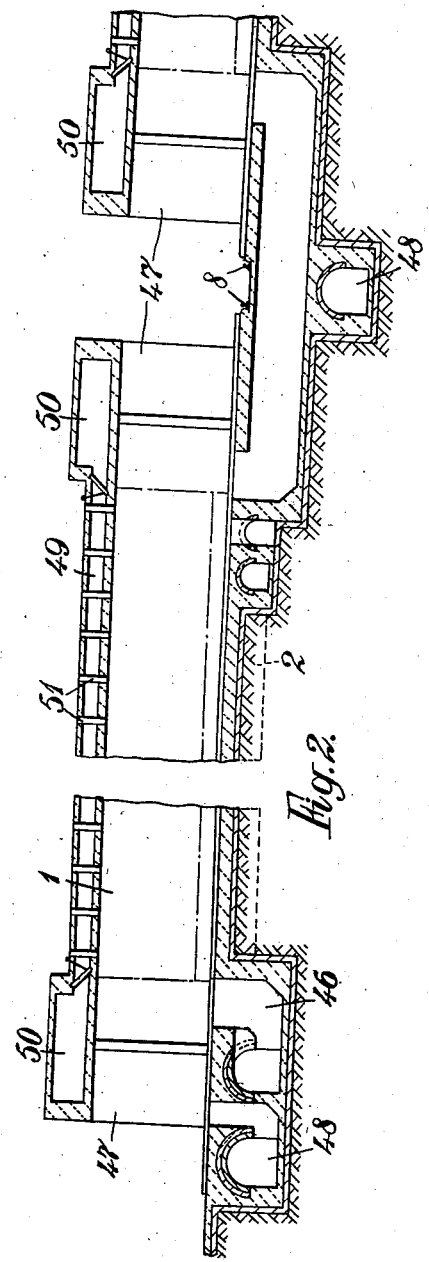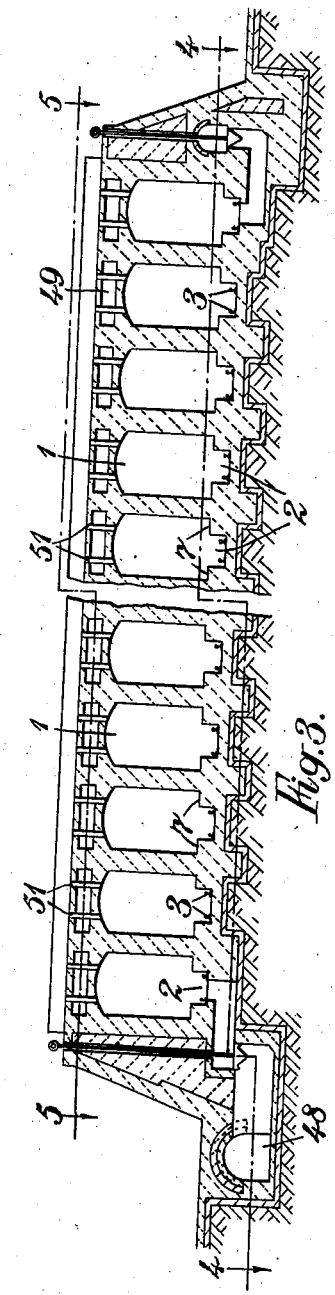

Sept. 27, 1938.　　　　　A. GEYER　　　　　2,131,418
CONTINUOUS KILN
Filed March 10, 1937　　　16 Sheets-Sheet 5

Sept. 27, 1938. A. GEYER 2,131,418
CONTINUOUS KILN
Filed March 10, 1937 16 Sheets-Sheet 10

Sept. 27, 1938.　　　　A. GEYER　　　　2,131,418
CONTINUOUS KILN
Filed March 10, 1937　　　16 Sheets-Sheet 11

Patented Sept. 27, 1938

2,131,418

UNITED STATES PATENT OFFICE 2,131,418

CONTINUOUS KILN

Arthur Geyer, Chippenham, England

Application March 10, 1937, Serial No. 130,204
In Great Britain March 13, 1936

10 Claims. (Cl. 25—134)

This invention relates to continuous kilns for burning bricks and the like goods of the kind in which the chambers have in the base of each of them a channel with rail tracks permitting trolleys or bogies, supporting sections constituting a removable floor arch with goods loaded thereon, to be introduced into and withdrawn from the chambers.

The present invention consists in a kiln of the kind above referred to, that is to say of the kind in which the chambers have in the base of each of them a channel with rail tracks permitting trolleys or bogies supporting sections constituting a removable floor arch to be introduced into and withdrawn from the chambers, characterized in this that the fire connection flues are provided between alternate chambers of a group or bank so that the firing of necessity takes place in succession in alternate chambers of the bank or group.

Thus, where there are two groups or banks of chambers and the chambers being regarded as numbered in succession 1, 1a, 2, 2a, 3, 3a, up to 8 and 8a, in one group or bank from left to right, and the chambers in the other group or bank being regarded as numbered 9a, 9, 10a, 10 and so on up to 16a and 16 from right to left of the next group or bank, the chambers 1 and 2 are connected by a fire connection flue at one side of the group or bank while the chambers 1a and 2a are similarly connected on the same side, the chamber 2 being connected with the chamber 3 and the chamber 2a with the chamber 3a on the opposite side and the remaining chambers being connected by fire connection flues in a similar order and manner so that fire will travel through the chambers 1, 2, 3 until it reaches the chamber 8 in one group or bank from which it will pass to the chamber 9 in the next group or bank and subsequently through chambers 10 and 11 and so on to the chamber 16 from which again the fire will pass to the chamber 1.

The passage of the fire in succession through the chambers 1a, 2a, to 16a and again to 1a will take place in a like sequence and as will be appreciated with the arrangement two fires may be in operation simultaneously.

Conveniently, the fire connection flues open into portions of the chambers in which goods are not set, and smoke or damp air flues are provided opening likewise into these portions which are dimensioned so that a wicket or wall may be built up therein to prevent the passage of the fire when a chamber is in fire into the smoke or damp air flues and doors are associated with the opening in the chambers by way of which access is available for setting and drawing for preventing the entry of air to the smoke or damp air flues.

As will be appreciated, the building up of a wall or wicket in the spaces provided in the ends of the chambers in which goods are not set, while permitting the passage of the fire from one chamber to the next alternate chamber of the group, will interrupt the connection of the chamber with the damp air flue and will also function as a protection for the door which may be of metal forming the closure member of the chamber.

In the roofs of the chamber there may be provided hot air flues extending lengthwise of the chamber and terminating in hot air flues running parallel with the inner and/or outer sides of each bank or group of chambers.

With such an arrangement communication between the chambers and the hot air flues may be established and interrupted by the provision of pipes extending through the outer roof or cover and into openings in the vault or arch of each chamber in such manner that when in this position fuel may be supplied to the chamber or when raised from the openings in the arch of the chamber may permit hot air to travel in an inward or outward direction to or from the chamber and from and into the hot air flue.

At this point it may be mentioned that the fire connection flues, smoke and damp air flues and the hot air flues are mutually independent systems of flues.

An important feature of a kiln in accordance with the invention is the construction or arrangement of the chambers so that they are all accessible from one side of a group or bank of chambers for setting goods therein and at the other side for the withdrawal of the burnt goods.

In certain cases, in accordance with the invention, the chambers may be arranged to be fired by furnaces located at one or other end of the chamber, and optionally in addition to be fired from the top of the chamber by the direct introduction of fuel thereinto.

Normally, however, kilns in accordance with the invention are arranged for top firing only by the introduction of fuel through openings provided in the roofs of the chambers.

Where the goods to be burnt in a kiln in accordance with the invention in their raw state possess an appropriate degree of rigidity or strength as would be the case with dry pressed bricks, they may be set directly one upon another so that the load due to the weight of the goods is transmitted through the underlying layers of the goods to the floor.

Where, on the other hand, the goods in their raw state possess an insufficient degree of strength as would be the case, for instance, with wire cut bricks means are provided whereby during the drying operation which is effected in the kiln, the goods are protected from the action of any excessive load.

Thus in accordance with the invention abutments may be provided in the walls of the chamber or chambers in which drying is effected at appropriate heights on which, during the drying operation, pallets or bearers on which the goods are stacked spaced an appropriate distance apart may be supported.

For instance, in accordance with the invention, the abutments may be so positioned that upon each of them pallets or bearers supporting four layers of bricks may be arranged.

Where provision is made for minimizing the load on the goods during the drying operation in the manner above described the trolleys or bogies employed are provided with a plurality of supports arranged one above the other at appropriate heights or distances apart adapted to engage the ends of the pallets or bearers which supports may be arranged to be raised and lowered, so that in lowering they will deposit the ends of the pallets or bearers on the abutments provided in the walls of the kiln and on raising they will operate to raise the ends of the pallets or bearers from the abutments to permit the withdrawal of the goods supported thereby from the chamber in which drying is effected.

After the drying operation has been completed it will be necessary to remove the pallets or bearers prior to burning and to this end after the goods supported on the pallets or bearers have been removed from the chamber by trolleys as above described, the platform of the trolley bearing the floor section is jacked up to an extent sufficient to enable the topmost layer of each of the lower tiers of goods to be brought against the lowermost layer of goods of the tier next above it so that the whole weight or load of the several tiers of goods is taken by the platform when the pallets being relieved from load may be withdrawn laterally.

In order that the lowermost layer of pallets may be removed in this way, the floor sections may be provided with elevated portions adapted to extend in an upward direction between the pallets or bearers or alternatively a layer or layers of goods supported on the floor section may be stacked or arranged to secure the like result.

When employing pallets or bearers in the manner above described after they have been removed, the drying operation being completed, there is left an excess space between arch and setting. The dry bricks re-set as described are jacked up as much as the shrinkage makes it necessary in order to fill the chamber as normally required.

At this point it may be mentioned that the employment of pallets or bearers somewhat in the manner above described is convenient even in dealing with, for instance, burnt bricks but in such case provision will be made for the introduction of pallets or bearers only below the lowest layer of bricks.

Where such provision is made the bearers and the bricks stacked thereon may be stored in a manner subsequently to be described so that the floor sections are again available for use in loading the kiln.

With such an arrangement there is preferably furnished adjacent to the side of each group of chambers, in the vicinity of the transfer tracks for the trolleys or bogies bearing the burnt goods, a stacking ground furnished with supports for the burnt goods of such height that when the floor sections are lowered into position thereon or into a position in which the burnt goods may be supported thereby free from the floor section and on pallets extending between such supports below the burnt goods when the trolleys or bogies and in the latter case the floor sections also may be withdrawn for re-use.

Furthermore a transfer track is preferably provided on the side of each of the stacking grounds remote from the kiln.

In the preferred arrangement there will thus be a kiln comprising a plurality of chambers arranged in two groups or banks with a space between in which a transfer track is provided for setting or loading and on the side of each group or bank of chambers remote from the said transfer track, a further transfer track for the passage of the trolleys or bogies with the burnt goods and two stacking grounds located between each of such last-mentioned transfer tracks and a further transfer track.

Each of the transfer tracks will normally extend to a loading place and such loading places are preferably furnished with mechanical loaders for transferring the burnt goods to wagons or lorries.

Additional transfer tracks may be provided for instance for permitting the passage of the trolleys or bogies from the one to the other of the transfer tracks located on the outer sides of the two banks or groups of chambers and these further tracks may be provided with loops permitting trolleys or bogies in transit in opposite directions to pass.

From the foregoing description it will be seen that at no stage between the delivery of the goods from the brick-making machine or the like on to the floor sections up to the loading of the finished goods on to lorries or wagons are the goods handled and thus economy of labour is secured while, if, as is preferred, the loading is effected by mechanical means a further saving in labour costs is effected.

The invention will be described further in detail, and by way of example, with reference to the accompanying drawings in which:—

Figure 1 is a plan view showing the general layout of a plant for burning bricks and like goods, in accordance with the invention;

Figures 2 and 3 are views in section of a bank of chambers of a kiln such as forms part of the plant illustrated in Figure 1, the sections being taken on planes respectively indicated by 2—2 and 3—3 of Figure 4, which is a sectional plan view on the line 4—4 of Figure 3.

Figures 8 and 9 are similar views illustrating one mode of stacking goods in the chambers for drying, while

Figures 13, 14, 15 and 16 are plan views illustrating alternative layouts in accordance with the invention, while

Figure 4:
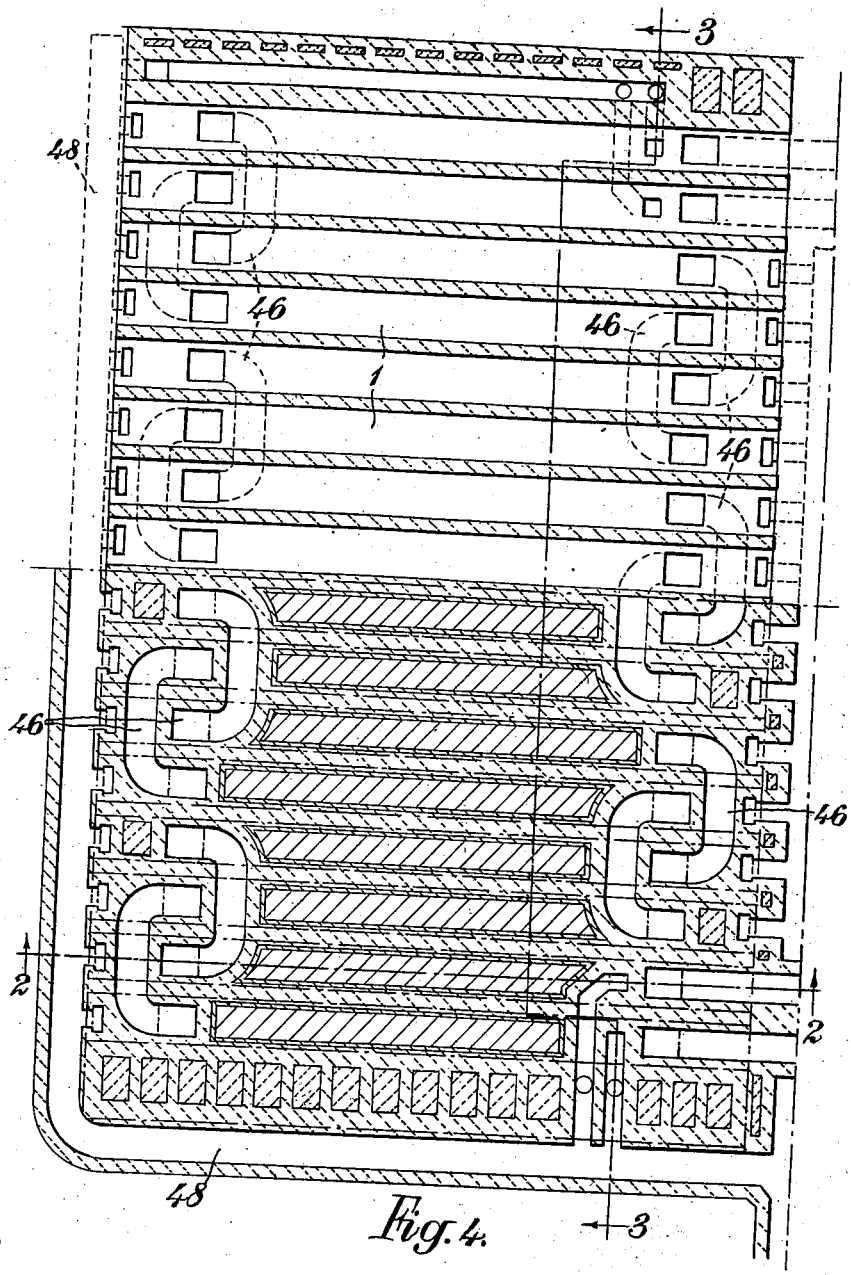
Figure 5:
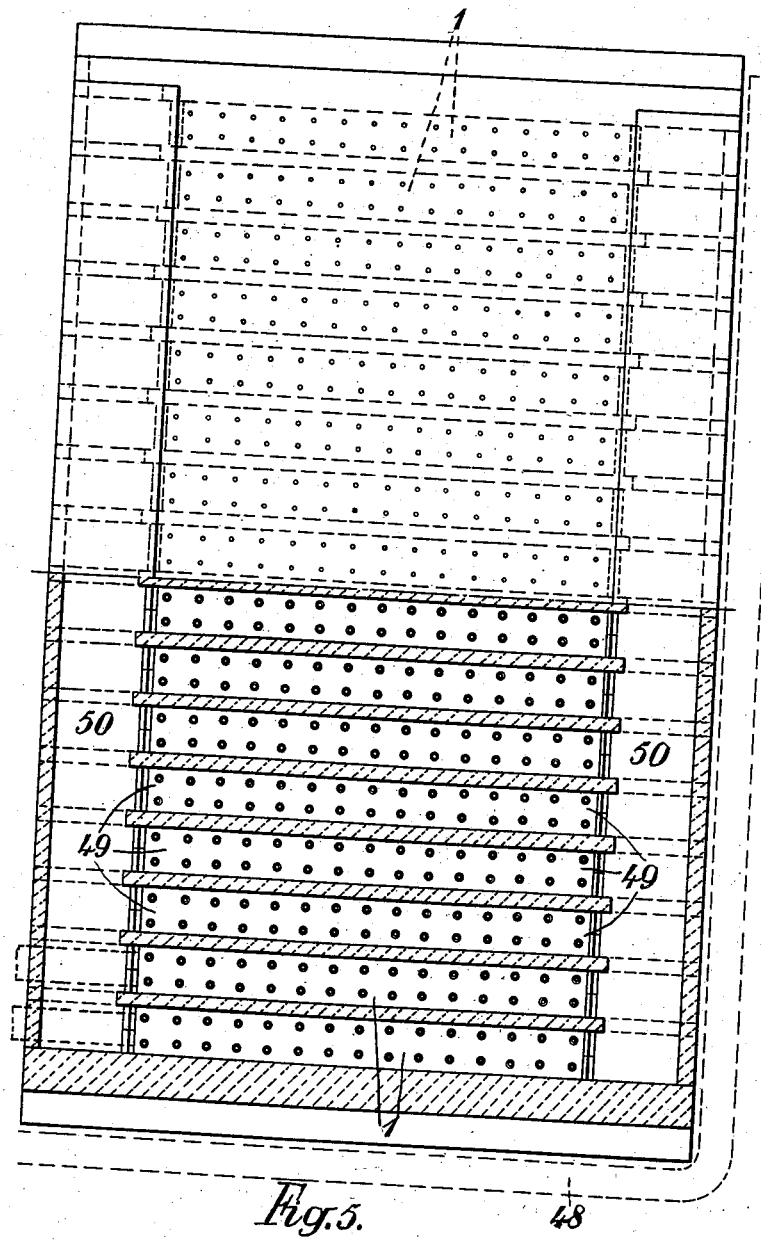
Figure 5 is a sectional plan view thereof on the line 5—5 of Figure 3.
Figure 6:
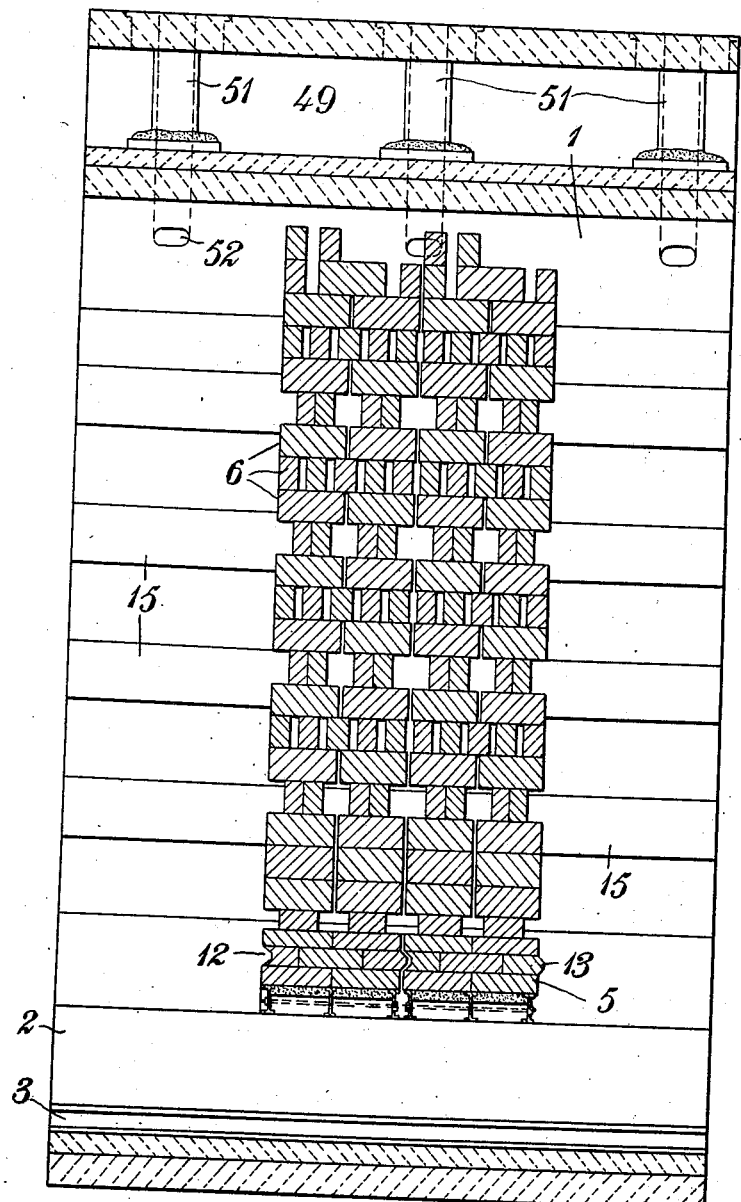
Figures 6 and 7 are fragmentary views in section on planes corresponding with the planes of section of Figures 2 and 3, and on a still larger scale of one chamber showing one manner of stacking bricks for burning in the kiln.
Figure 7:
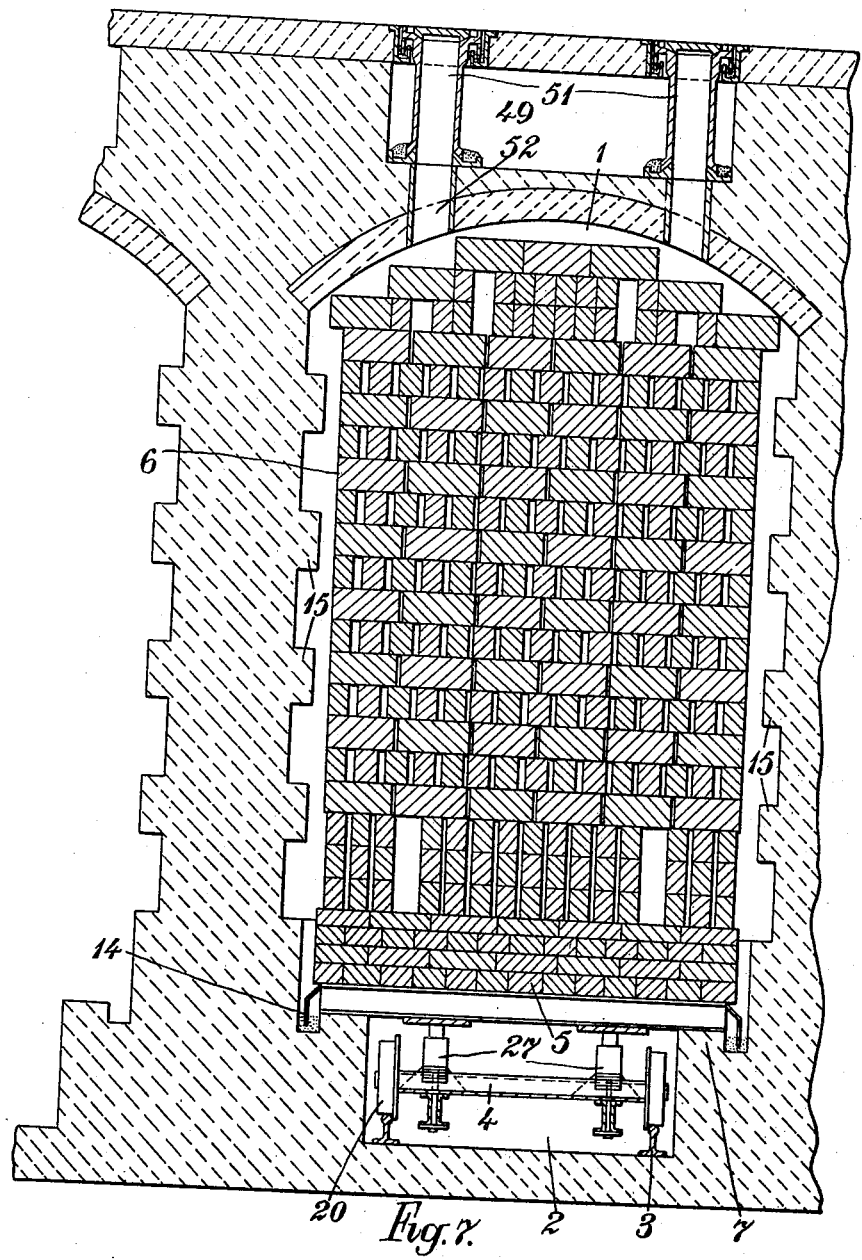
Figure 8:
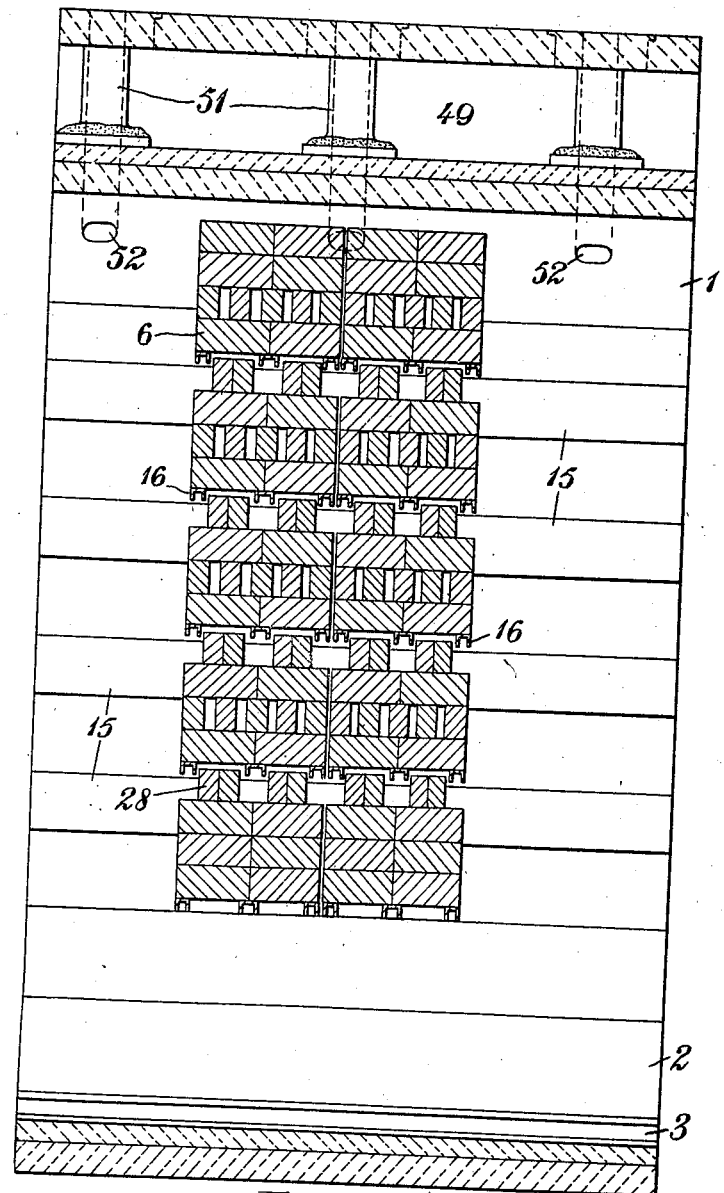
Figure 9:
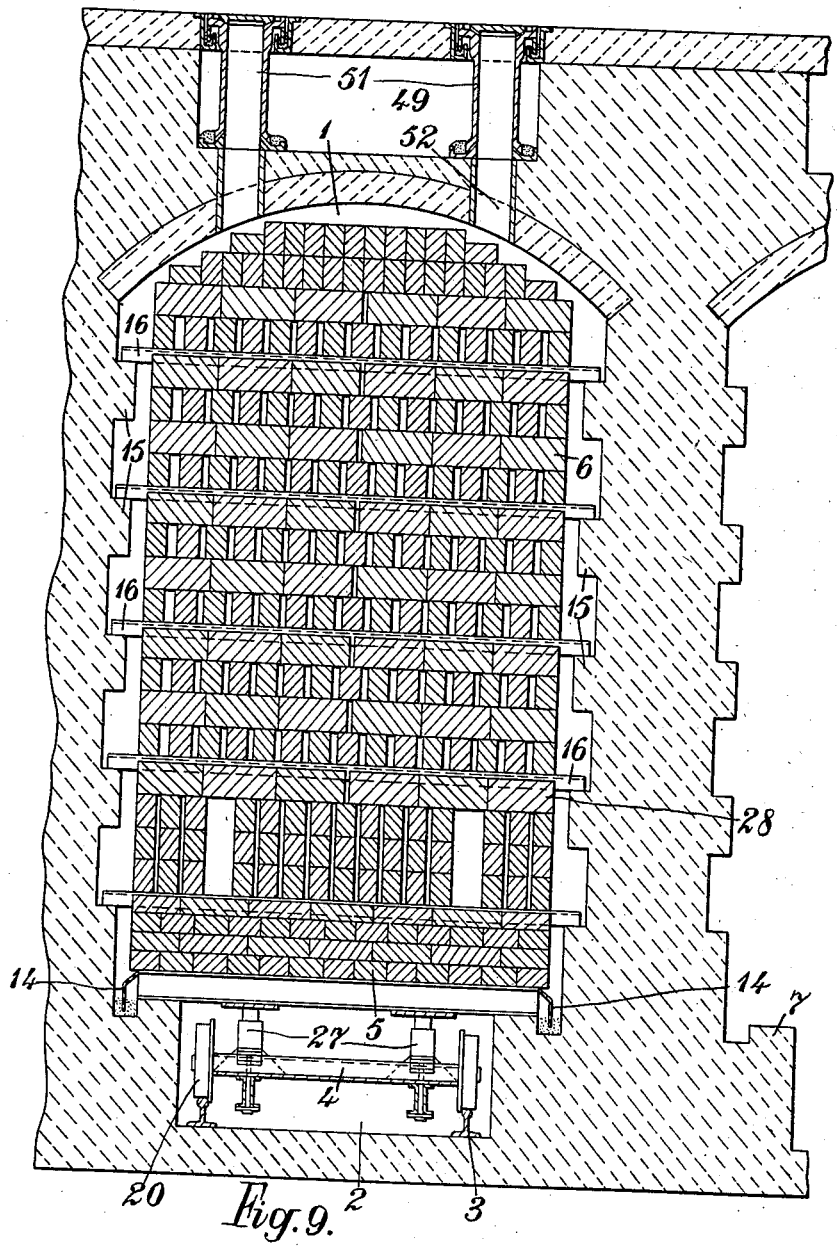

As may be seen from Figures 1, 2, 3, 5, 13, 14, 15, 16 and 17 the kiln comprises a plurality of chambers 1 adapted to be fired in an appropriate sequence and as shown in Figures 1 and 3 and more clearly in Figures 7 and 9 in the base of each of the chambers there is a channel 2 in which rail tracks 3 are laid permitting trolleys or bogies 4 supporting sections 5 (see Figures 7, 9, 10, 11 and 12) constituting a removable floor with goods and, as shown in Figures 6, 7, 8 and 9, bricks 6 loaded thereon to be introduced into and withdrawn from the chambers.

Adjacent to the base of each of the chambers, as may be seen in Figures 3, 7, 9 and 12 are provided supports 7 for the floor sections so positioned that the trolleys or bogies may be withdrawn, leaving the sections and the goods thereon in position in the chamber during drying and burning.

With the rail tracks in the channels of the several chambers there are associated transfer tracks 8 for the passage of the trolleys or bogies with the sections constituting the removable floor supported thereon to the machine house 9 shown in Figures 1, 13, 14, 15 and 16 and where the goods to be burnt are stacked on them and for the passage of the trolleys or bogies, when stacked, to the kiln and also with the burnt goods thereon to a storage or stacking ground 10 as shown in these figures or to a loading place 11 as shown in Figure 1 where the goods may be transferred to railway wagons or lorries.

The transfer tracks which extend lengthwise of the bank or banks of chambers constituting the kiln are, as may be seen from Figure 2, located at a level such that the trolleys or bogies bearing the floor sections may be run onto the transfer trolleys or bogies.

Figure 15:
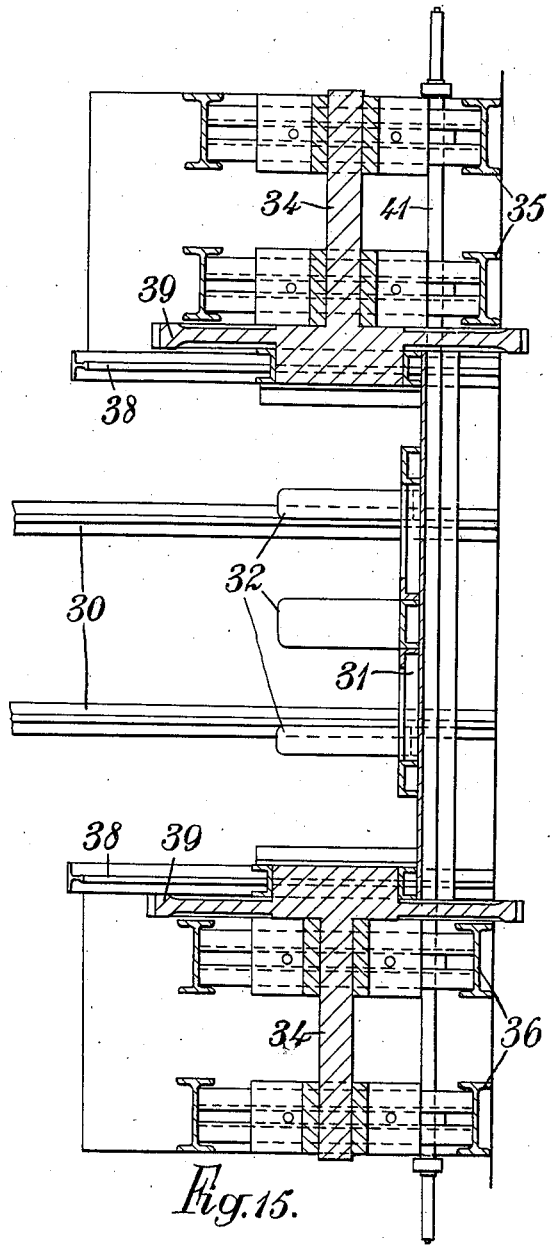
Figure 16:
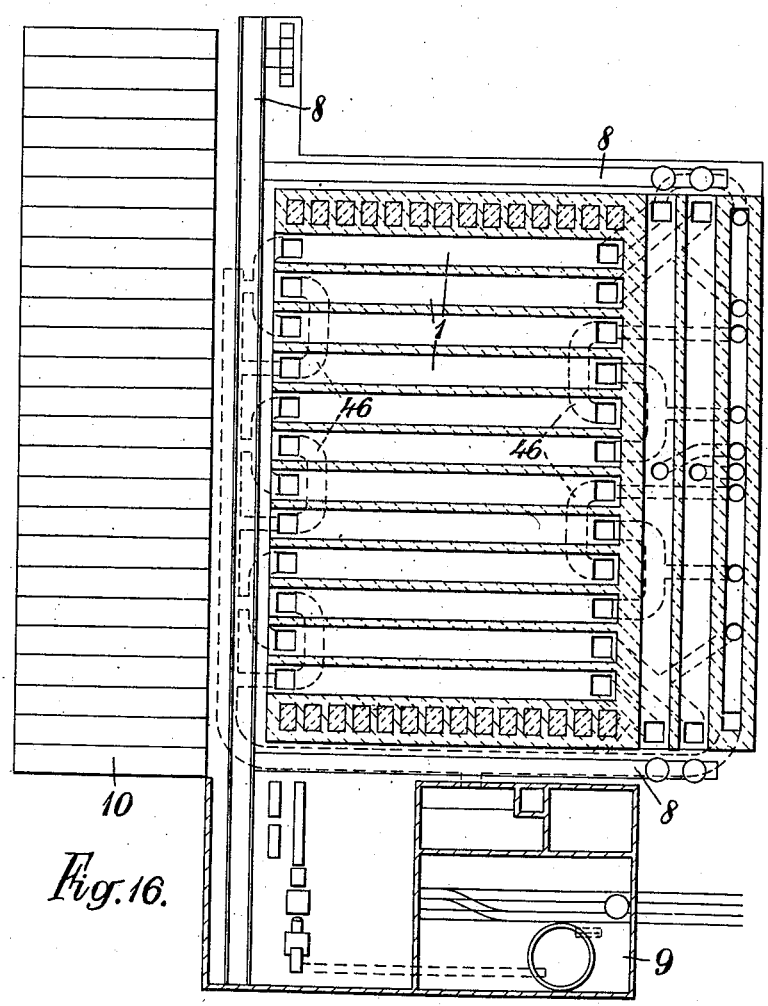
Figure 17:
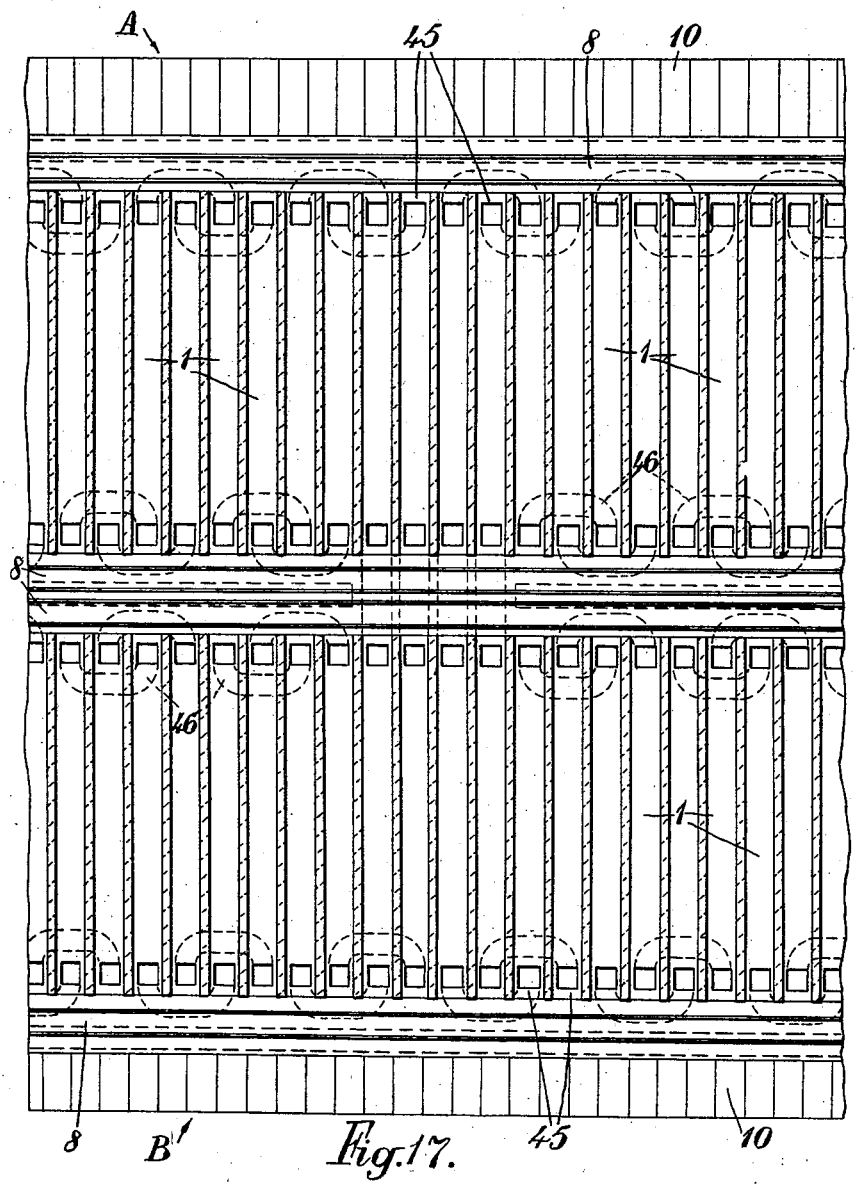
Figure 17 is a fragmentary plan view illustrating a suitable arrangement in the case of a kiln having a large number of chambers.

In the construction illustrated in Figures 1, 15 and 17 the chambers are arranged in two banks denoted generally as A and B.

Figure 13:
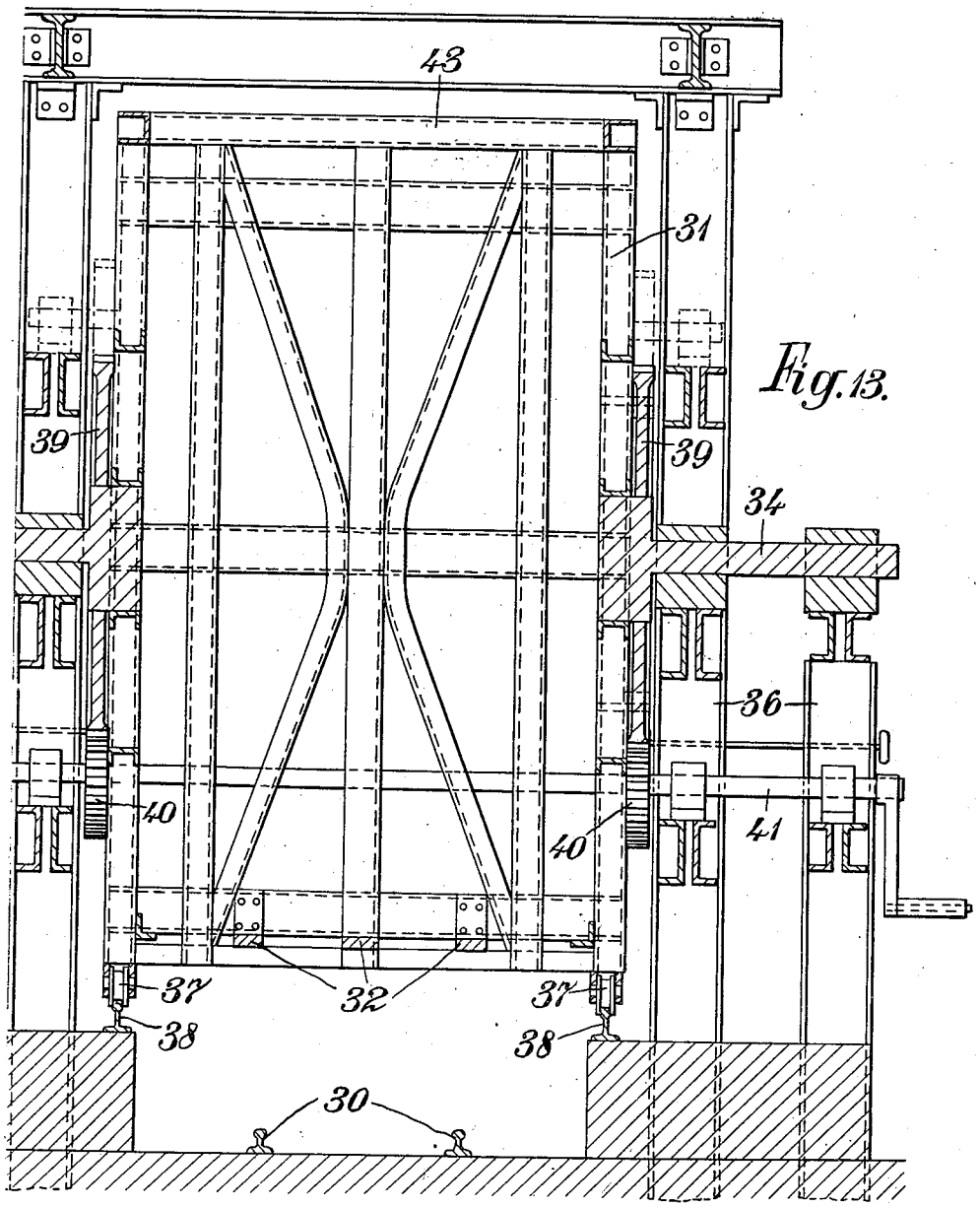
Figure 14:
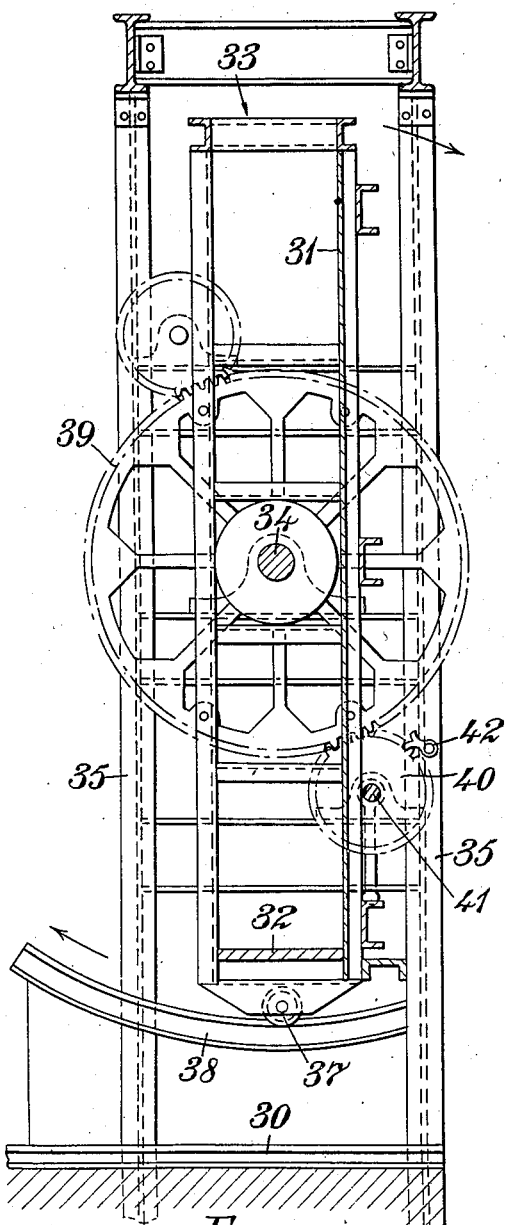

In the case of the constructions illustrated in Figures 13, 14 and 15 only one bank of chambers is shown.

Figure 11:
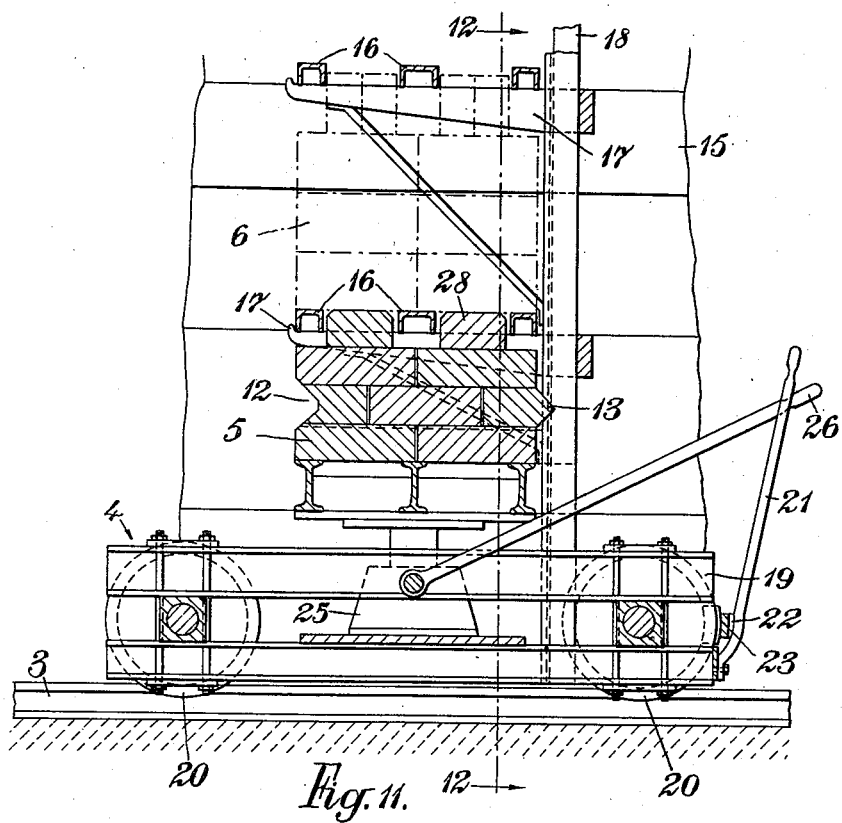
Figure 11 is a view in elevation partly in section on the line 11—11 of Figure 10.

As may be seen from Figures 6 and 11 the floor sections are so formed that they engage with one another on one side being furnished with a groove 12 and on the other side with a tongue portion 13 adapted to promote the securing of a gas tight joint between the sections.

Figure 12:
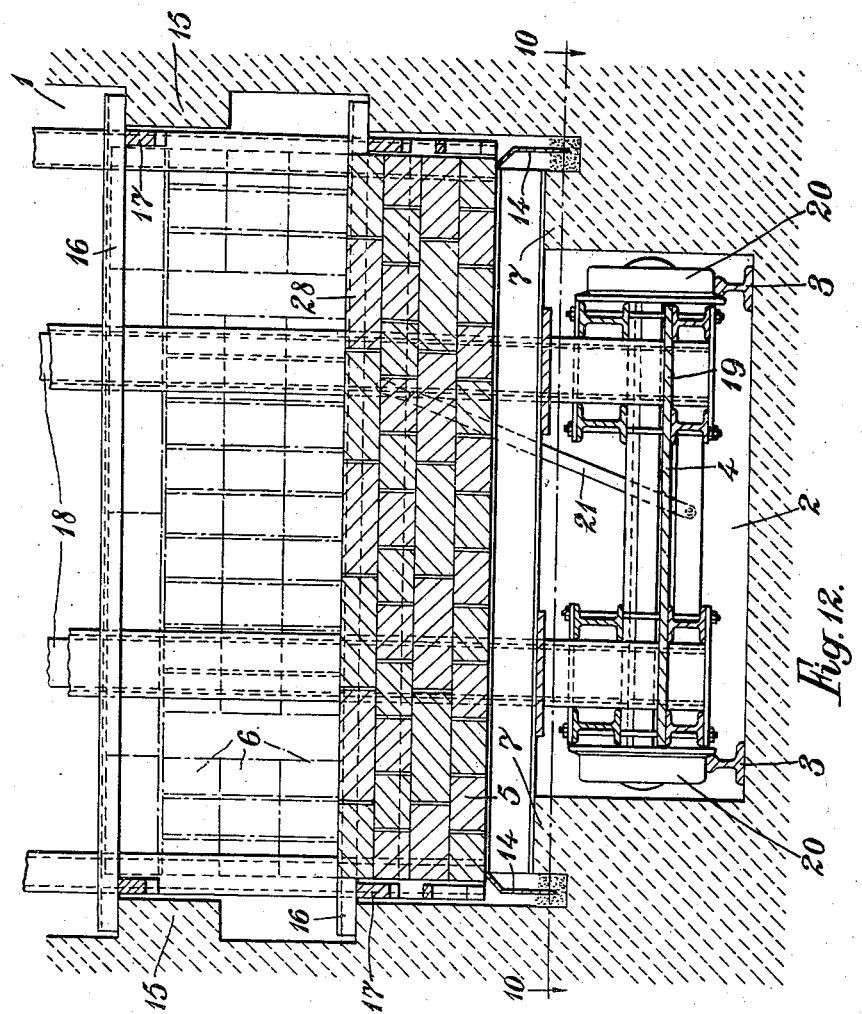
Figure 12 is a fragmentary view on the line 12—12 of Figure 11 on an enlarged scale, illustrating a construction of bogie or trolley for setting goods in the chambers of the kiln.

The two remaining sides of each floor section are provided, as may be seen in Figures 7, 9 and 12 with a skirt 14 adapted to extend into a sand seal for the like purpose.

Where the goods to be burnt in the kiln, in accordance with the invention, in their raw state possess an appropriate degree of rigidity or strength as would be the case with dry pressed bricks, they may be set directly one upon another so that the load due to the weight of the goods is transmitted through the underlying layers of the goods to the floor.

Figure 10:
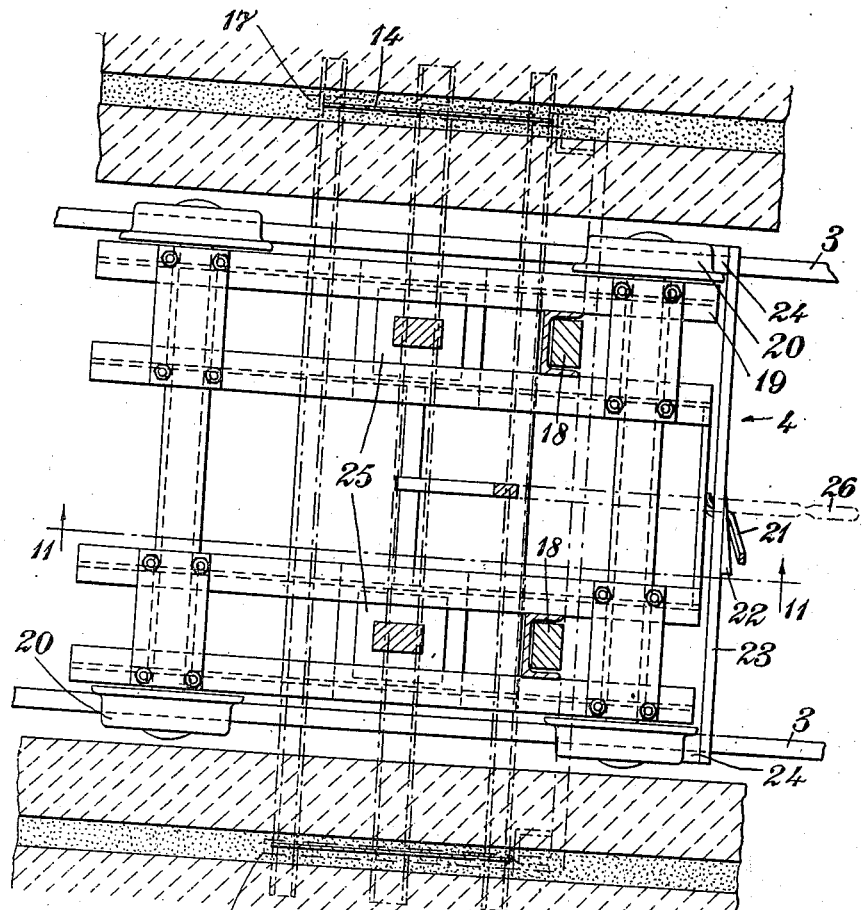
Figure 10 is a sectional plan view on the line 10—10 of Figure 12.

Where, on the other hand, the goods in their raw state possess an insufficient degree of strength as would be the case, for instance, with wire cut bricks, within the chamber are provided abutments 15 as shown in Figures 7, 8 and 9 positioned at appropriate heights upon each of which pallets or bearers 16 as shown in Figure 9 supporting four layers of bricks or the like may be arranged.

Where provision is made for minimizing the load on the goods the trolleys or bogies employed in setting and unloading the chambers are provided with a plurality of supports 17, see Figures 10, 11 and 12, arranged one above another at appropriate heights or distances apart adapted to engage the ends of the pallets or bearers which supports may be arranged to be raised and lowered, so that in lowering they will deposit the ends of the pallets or bearers on the abutments provided in the walls of the kiln and on raising will operate to raise the ends of the pallets or bearers from the abutments to permit the withdrawal of the goods supported thereby from the chamber in which drying is effected.

These supports are connected with standards 18 removably secured to the frame 19 of the trolleys or bogies, the wheels 20 of which are secured to axles running in bearings provided in the frame.

With the frame is pivotally connected a hand lever 21 a portion of which co-operates with a ramp 22 on the rod 23 connecting together two brake shoes 24 co-operating with the wheels for arresting motion of the trolleys or bogies.

Further, the trolleys or bogies are provided with two jacks 25, adapted to be operated simultaneously or in unison by the hand lever 26, the actuation of the jacks being necessary in raising or lowering the sections forming the floor of the chambers and in the operation of removing the bearers.

As will be understood, where the character of the goods is such that the employment of bearers or pallets in the drying operation is unnecessary the standards will be removed from the frame.

In connection with Figures 7 and 9 it may be pointed out that the jacks 27 are of somewhat different construction. They are designed, however, to perform the function of raising and lowering the sections forming the floor of the chamber.

After the drying operation has been completed removal of the pallets or bearers prior to burning will be necessary and after the goods supported on the pallets or bearers have been removed from the chamber on trolleys or bogies as above described, the platform of the trolley or bogie bearing the floor section is jacked up to an extent sufficient to enable the topmost layer of each of the lower tiers of goods to be brought against the lowermost layer of goods of the tier next above it so that the whole weight or load of the several tiers of goods is taken by the platform when the pallets being relieved from load may be withdrawn laterally.

In order that this may be effected the floor sections are, in the construction illustrated in Figures 10 to 12, provided with elevated portions 28 adapted to extend in an upward direction between the pallets or bearers 16, or alternatively, a layer or layers of goods supported on the floor section may be stacked or arranged to secure the like result.

At this point it may be repeated that even in dealing with goods, for instance dry pressed bricks where the employment of pallets or bearers to prevent crushing is unnecessary, provision may be made for the employment of pallets or bearers only below the lowermost layer of bricks which are introduced after the burning operation has been completed so that the bricks supported on their bearers may be stacked on the stacking ground on which are furnished supports 29 for the bearers or pallets or the floor sections, adapted to retain them at a height enabling the trolleys or bogies to be introduced beneath them and to be withdrawn.

Each of the transfer tracks provided will normally extend to a loading place 11 where wagons or lorries may be loaded with bricks.

In the case of the kilns as shown in Figures 1, 2, 3, 4, 5, 6, 14, 15, 16, and 17 the interior of each of the chambers is accessible from one side of a group or bank for setting the goods therein and at the other side for the withdrawal of the burnt goods, and where the kilns are arranged in two banks the openings 44 whereby the goods may be set in the kiln are provided on the sides of the two banks which are adjacent, the openings 45 for the withdrawal of the burnt goods being arranged on the opposite sides of the banks of chambers.

In certain cases the chambers may be arranged to be fired by furnaces located at one or other end of the chamber and optionally in addition to be fired from the top of the chamber by the direct introduction of fuel thereinto.

Generally, however, the kilns will be arranged for top firing only.

The fire connection flues 46 are provided between alternate chambers of a group.

Thus, where there are two groups or banks of chambers and the chambers being regarded as numbered in succession 1, 1a, 2, 2a, 3, 3a up to 8 and 8a, see Figure 15, in one group or bank from left to right, and the chambers in the other group or bank being regarded as numbered 9a, 9, 10a, 10 and so on up to 16a and 16 from right to left of the next group or bank, the chambers 1 and 2 are connected by a fire connection flue at one side of the group or bank while the chambers 1a and 2a are similarly connected on the same side, the chamber 2 being connected with the chamber 3 and the chamber 2a with the chamber 3a on the opposite side and the remaining chambers being connected by fire connection flues in a similar order and manner so that fire will travel through the chambers 1, 2, 3, until it reaches the chamber 8 in one group or bank from which it will pass to the chamber 9 in the next group or bank and subsequently through chambers 10 and 11 and so on to the chamber 16 from which again the fire will pass to the chamber 1.

The fire connection flues open into portions 47 of the chambers (see Figure 2) in which goods are not set, and smoke or damp air flues 48 are provided opening likewise into these portions which are dimensioned so that a wicket or wall may be built up therein to prevent the passage of the fire when a chamber is in fire into the smoke or damp air flues and doors are associated with the opening in the chambers by way of which access is available for setting and drawing for preventing the entry of air to the smoke or damp air flues.

In the roofs of each of the chambers there is provided a hot air flue 49 extending lengthwise of the chamber and terminating in a hot air flue 50 running parallel with the inner and/or outer sides of each bank or group of chambers.

With such an arrangement communication between the chambers and the hot air flues may be established and interrupted by the provision of pipes 51 extending through the outer roof or cover and into openings 52 in the vault or arch of each chamber in such manner that when in this position fuel may be supplied to the chamber or when raised from the openings in the arch of the chamber may permit hot air to travel in an inward or outward direction to or from the chamber and from and into the hot air flue.

As will be seen the fire connection flues, smoke and damp air flues and the hot air flues are mutually independent systems of flues.

I claim:

1. A continuous kiln for burning bricks and the like comprising a bank of chambers adapted to be fired in an appropriate sequence, a channel in the base of each of the said chambers, rail tracks located in the channels whereby trolleys supporting sections constituting removable floor arches with goods loaded thereon may be introduced into and withdrawn from the chambers, and fire connection flues interconnecting alternate chambers of the bank so that the firing of necessity travels in succession through alternate chambers of the bank.

2. A continuous kiln for burning bricks and the like comprising a bank of chambers adapted to be fired in an appropriate sequence, each of said chambers having a portion adapted for the setting of goods therein and a portion which is not so adapted, a channel in the base of each of said chambers, rail tracks located in the channels whereby trolleys supporting sections constituting removable floor arches with goods loaded thereon may be introduced into and withdrawn from the chambers, and fire connection flues interconnecting alternate chambers of the bank and opening into the chambers at the portions thereof which are not adapted for the setting of goods therein so that the firing of necessity travels in succession through alternate chambers of the bank.

3. A continuous kiln for burning bricks and the like comprising a bank of chambers adapted to be fired in an appropriate sequence, each of said chambers having a portion adapted for the setting of goods therein and a portion which is not so adapted, a channel in the base of each of said chambers, rail tracks located in the channels whereby trolleys supporting sections constituting removable floor arches with goods loaded thereon may be introduced into and withdrawn from the chambers, fire connection flues interconnecting alternate chambers of the bank and opening into the chambers at the portions thereof which are not adapted for the setting of goods therein so that the firing of necessity travels in succession through alternate chambers of the bank, and smoke or damp air flues which also open into the chambers at the portions thereof which are not adapted for the setting of goods therein.

4. A continuous kiln for burning bricks and the like comprising a bank of chambers adapted to be fired in an appropriate sequence, each of said chambers having a portion adapted for the setting of goods therein and a portion which is not so adapted, a channel in the base of each of said chambers, rail tracks located in the channels whereby trolleys supporting sections constituting removable floor arches with goods loaded thereon may be introduced into and withdrawn from the chambers, fire connection flues interconnecting alternate chambers of the bank and opening into the chambers at the portions thereof which are not adapted for the setting of goods therein so that the firing of necessity travels in succession through alternate chambers of the bank, smoke or damp air flues which also open into the chambers at the portions thereof which are not adapted for the setting of goods therein, the said portions of the chambers which are not adapted for the setting of goods therein being so dimensioned that a wicket may be built up therein to prevent the passage of the fire when a chamber is in fire into the smoke or damp air flues, and doors associated with the openings in the chambers by way of which access is available for setting and and drawing for preventing the entry of air into the smoke or damp air flues.

5. A continuous kiln for burning bricks and the like comprising a bank of chambers adapted to be fired in an appropriate sequence, a channel in the base of each of the said chambers, rail tracks located in the channels whereby trolleys supporting sections constituting removable floor arches with goods loaded thereon may be introduced into and withdrawn from the chambers, and fire connection flues interconnecting alternate chambers of the bank so that the firing of necessity travels in succession through alternate chambers of the bank, each of the said chambers being provided with a hot air flue which extends lengthwise thereof and which terminates in a further hot air flue extending parallel with the ends of the chambers.

6. A continuous kiln for burning bricks and the like comprising a bank of chambers adapted to be fired in an appropriate sequence, each of said chambers having a portion adapted for the setting of goods therein and a portion which is not so adapted, a channel in the base of each of said chambers, rail tracks located in the channels whereby trolleys supporting sections constituting removable floor arches with goods loaded thereon may be introduced into and withdrawn from the chambers, and fire connection flues interconnecting alternate chambers of the bank and opening into the chambers at the portions thereof which are not adapted for the setting of goods therein so that the firing of necessity travels in succession through alternate chambers of the bank, each of the said chambers being provided with a hot air flue which extends lengthwise thereof and which terminates in a further hot air flue extending parallel with the ends of the chambers.

7. A continuous kiln for burning bricks and the like comprising a bank of chambers adapted to be fired in an appropriate sequence, each of said chambers having a portion adapted for the setting of goods therein and a portion which is not so adapted, a channel in the base of each of said chambers, rail tracks located in the channels whereby trolleys supporting sections constituting removable floor arches with goods loaded thereon may be introduced into and withdrawn from the chambers, fire connection flues interconnecting alternate chambers of the bank and opening into the chambers at the portions thereof which are not adapted for the setting of goods therein so that the firing of necessity travels in succession through alternate chambers of the bank, and smoke or damp air flues which also open into the chambers at the portions thereof which are not adapted for the setting of goods therein, each of the said chambers being provided with a hot air flue which extends lengthwise thereof and which terminates in a further hot air flue extending parallel with the ends of the chambers.

8. A continuous kiln for burning bricks and the like comprising a bank of chambers adapted to be fired in an appropriate sequence, each of said chambers having a portion adapted for the setting of goods therein and a portion which is not so adapted, a channel in the base of each of said chambers, rail tracks located in the channels whereby trolleys supporting sections constituting removable floor arches with goods loaded thereon may be introduced into and withdrawn from the chambers, fire connection flues interconnecting alternate chambers of the bank and opening into the chambers at the portions thereof which are not adapted for the setting of goods therein so that the firing of necessity travels in succession through alternate chambers of the bank, smoke or damp air flues which also open into the chambers at the portions thereof which are not adapted for the setting of goods therein, the said portions of the chambers which are not adapted for the setting of goods therein being so dimensioned that a wicket may be built up therein to prevent the passage of the fire when a chamber is in fire into the smoke or damp air flues, and doors associated with the openings in the chambers by way of which access is available for setting and drawing for preventing the entry of air into the smoke or damp air flues, each of the said chambers being provided with a hot air flue which extends lengthwise thereof and which terminates in a further hot air flue extending parallel with the ends of the chambers.

9. A continuous kiln as claimed in claim 5 comprising for the establishment and interruption of communication between the chambers and the hot air flues, pipes extending through the outer roof and into openings in the vault of each chamber whereby when the pipes are in this position fuel may be supplied to the chamber and when raised from the openings in the vault of the chamber hot air may be permitted to travel in an inward or outward direction to or from the chamber and from and into the hot air flue.

10. A continuous kiln as claimed in claim 1 having those ends of the chambers adjacent to one and the same side of the bank of chambers accessible for setting goods therein and the ends of the chambers at the opposite side of the bank accessible for the withdrawal of burnt goods.

ARTHUR GEYER.